United States Patent [19]

Zaleckas

[11] 4,137,100
[45] Jan. 30, 1979

[54] FORMING ISOLATION AND DEVICE REGIONS DUE TO ENHANCED DIFFUSION OF IMPURITIES IN SEMICONDUCTOR MATERIAL BY LASER

[75] Inventor: Vincent J. Zaleckas, Wall, N.J.

[73] Assignee: Western Electric Company, New York, N.Y.

[21] Appl. No.: 846,221

[22] Filed: Oct. 26, 1977

[51] Int. Cl.² .................... B23K 27/00; H01L 21/268
[52] U.S. Cl. ................................. 148/1.5; 148/187; 148/188; 219/121 L; 357/91; 427/53
[58] Field of Search ............... 156/643; 219/121 L; 148/1.5, 175, 187, 188; 427/53; 357/91

[56] References Cited

U.S. PATENT DOCUMENTS

| | | | |
|---|---|---|---|
| 3,364,087 | 1/1968 | Solomon | 156/4 |
| 3,420,719 | 1/1969 | Potts | 148/188 |
| 3,458,781 | 7/1969 | Simon | 317/235 |
| 3,585,088 | 6/1971 | Schwuttle et al. | 148/174 |
| 3,940,289 | 2/1976 | Marquardt et al. | 148/1.5 |
| 3,991,296 | 11/1976 | Kosima et al. | 219/121 L |
| 3,997,964 | 12/1976 | Holbrook et al. | 29/583 |
| 4,015,221 | 3/1977 | Dalton | 332/7.51 |
| 4,059,461 | 11/1977 | Fan et al. | 148/1.5 |

OTHER PUBLICATIONS

Kutukova et al., "Laser Annealing of Implanted Si" Sov. Phys. Semicond., vol. 10, (Mar. 1976), 265 (Eng.).
Josh et al., "Induced Impurity . . . in S/C by Lasers", IBM-TDB, vol. 11, (1968) 104.
Hutchins, "Localized . . . Diffusions . . . Laser . . . ", IBM-TDB, 16 (1974) 2585.
Bogatyrev et al., "Imp", PN-junctions . . . Laser Pulse Heating", Sov. Phys. Semicond., vol. 10, (Jul. 1976) 826.

*Primary Examiner*—L. Dewayne Rutledge
*Assistant Examiner*—Upendra Roy
*Attorney, Agent, or Firm*—D. J. Kirk

[57] ABSTRACT

An array of blind holes are formed in a silicon wafer with a laser and a dopant deposited therein. The wafer is then placed in a furnace for a time and at a temperature sufficient to drive the dopant into the wafer to a predetermined depth.

Alternatively, the material may be applied to the wafer prior to the drilling of the blind holes and the dopant driven into the wafer as the holes are being formed.

12 Claims, 11 Drawing Figures

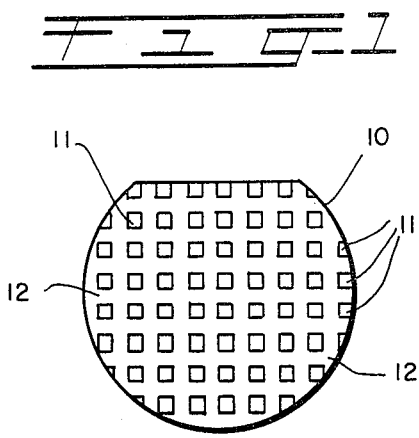
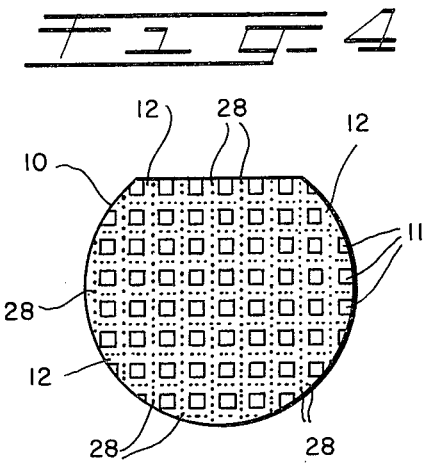
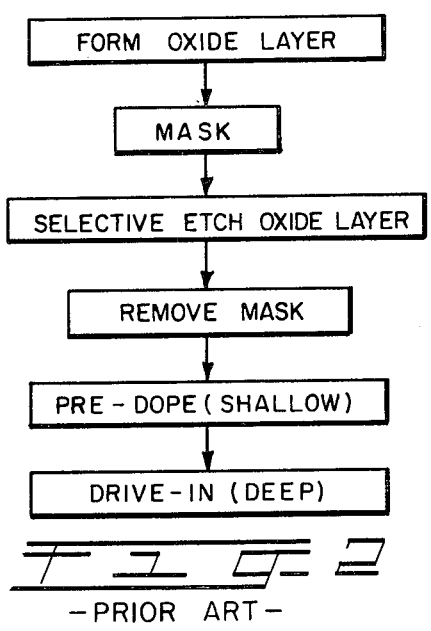
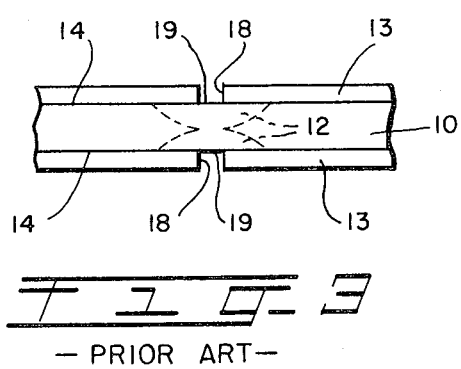
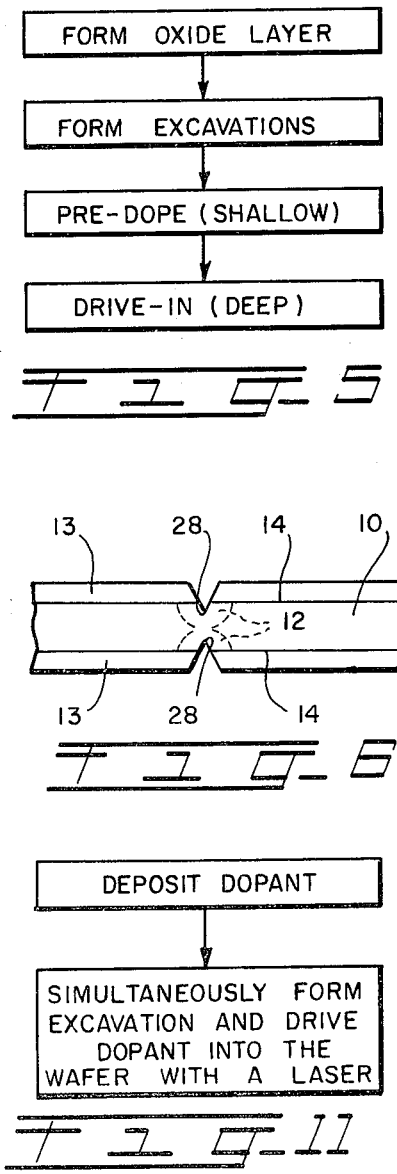

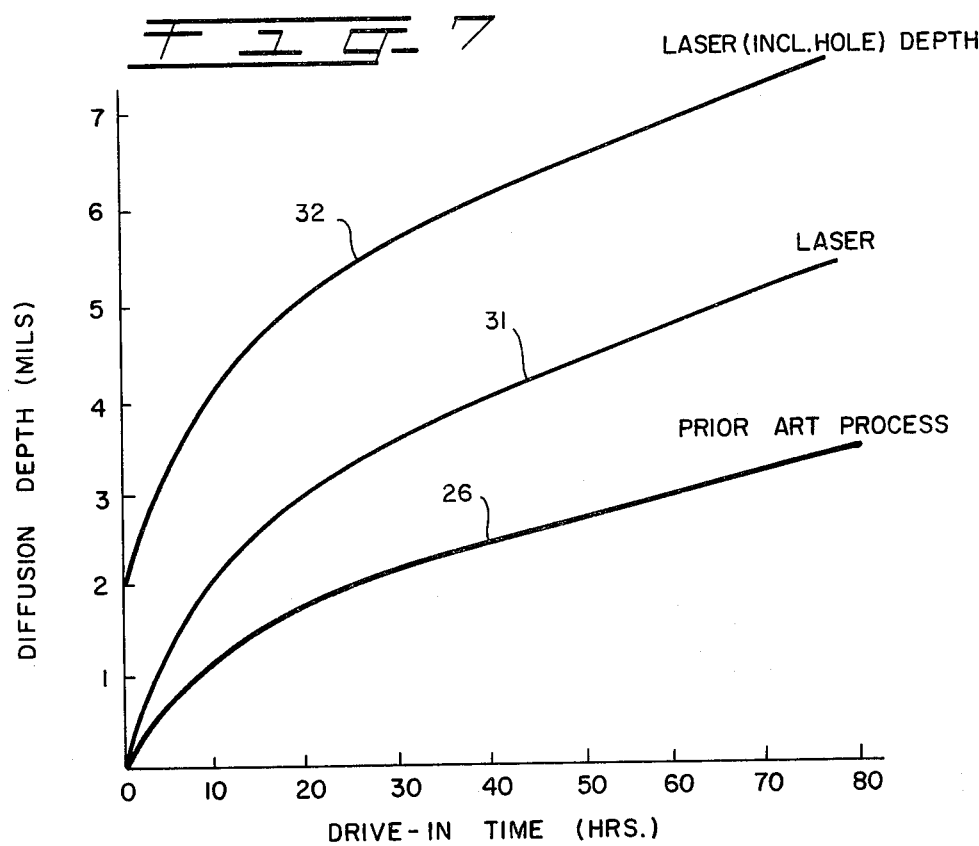
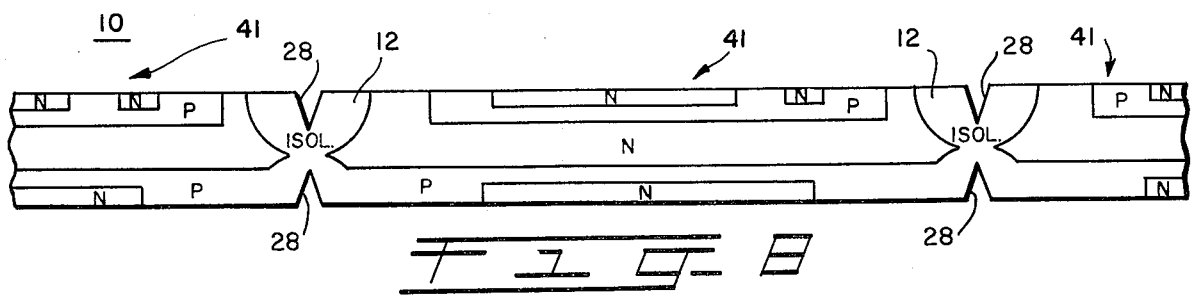
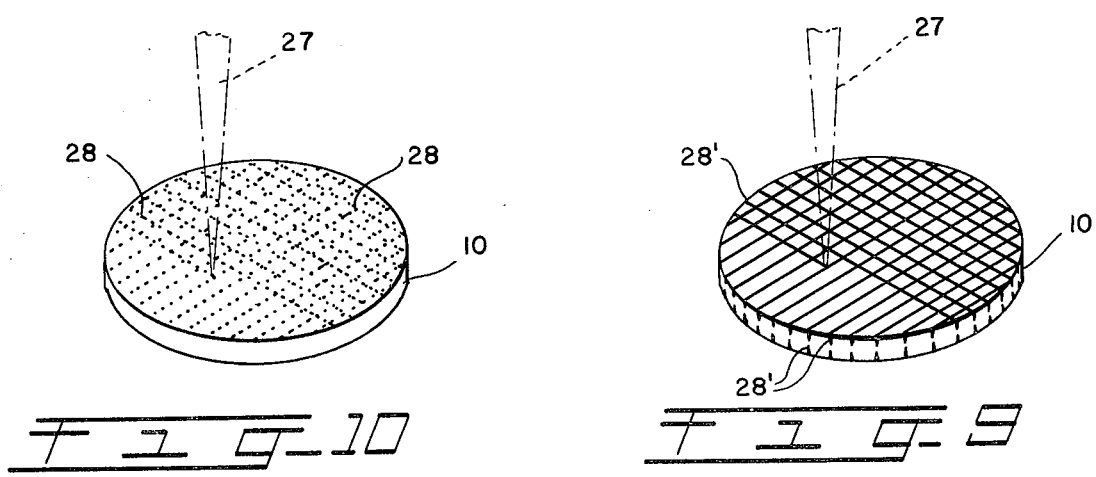

FORMING ISOLATION AND DEVICE REGIONS DUE TO ENHANCED DIFFUSION OF IMPURITIES IN SEMICONDUCTOR MATERIAL BY LASER

BACKGROUND OF THE INVENTION

1. Field of the Invention

This invention relates to semiconductor processes, and more particularly, to processes for diffusing impurities into semiconductor material.

2. Description of the Prior Art

In the manufacture of some semiconductor device structures, it is necessary to form isolation regions that extend completely through the device to provide electrical isolation between active portions of the device. It is known to isolate areas on a semiconductor wafer by etching troughs in the wafer between devices. However, such troughs would weaken or destroy the devices if they were to extend completely through the wafer. Additionally, devices so isolated would expose the doped layers of the devices along the walls of the troughs which can result in undesirable leakage currents therebetween.

Isolation regions may also be formed in a silicon wafer by initially growing an oxide layer on at least one of the major surfaces thereof. Openings are selectively formed in the oxide layer using well-known photolithographic and etching techniques. Dopant material is then deposited on the major surfaces of the wafer, including the oxide layer openings, and driven into the wafer to a first depth of about 0.1 of a micron in a high temperature furnace at about 1200° C. for about 20 minutes. The remaining dopant material is then removed and the wafer is again placed in the high temperature furnace at about 1256° C. for approximately 78 hours to diffuse the dopant into the silicon to a predetermined depth of about 0.003 of an inch. The active portions of the devices are then fabricated in the wafer, between the isolation regions, in a well-known manner and the wafer particulated into a multitude of discrete devices.

Although such a method has been found to be most effective and reliable, the length of the diffusion "drive-in" time required to form such deep isolation regions is clearly undesirable and the lateral diffusion of the dopant material is substantial (i.e., equal or greater than the depth), resulting in fewer active devices for a given wafer surface area.

Additionally, at present, such semiconductor devices, requiring deep isolation regions, are fabricated on wafers that are approximately 1.5 inches in diameter and are 0.006 of an inch thick. Conversion to larger diameter wafers would be more economical, but would necessitate an increase in the wafer thickness to provide the mechanical strength required in handling the wafers during further processing steps. However, such an increase in thickness would substantially increase the dopant diffusion time. For example, to convert from a 1.5 to a 2.0 inch wafer, it would be necessary to increase the wafer thickness to 0.010 of an inch which, in turn, would increase the dopant drive-in time from 78 hours to about 300 hours at the same temperature. Furthermore, the lateral spreading of the dopant will also increase which can interfere with the device performance as well as decreasing the number of devices that can be fabricated on a wafer.

An article entitled "Studies of Anomalous Diffusion of Impurities in Silicon," by K. H. Nicholas in *Solid-State Electronics*, Pergamon Press 1966, Vol. 9, pp. 35–47 indicates that fast diffusion of impurities was found to occur in silicon crystal if the crystal had been mechanically polished. However, such mechanical polishing cannot be accomplished selectively and there is no indication that such a process could effectively decrease the lateral diffusion of the dopant material.

Accordingly, there exists a need for a process for doping semiconductor material with decreased "drive-in" times as well as decreased lateral diffusion.

SUMMARY OF THE INVENTION

The foregoing problems have been overcome by the instant process for diffusing a dopant into a semiconductor material wherein an excavation is formed in the material using a laser beam and a dopant deposited therein. The wafer is then subjected to an elevated temperature for a time sufficient to diffuse the dopant into the wafer to a predetermined depth.

In an alternate embodiment, the semiconductor material may be coated with the dopant and a laser beam directed at the coated material to simultaneously form the excavation and drive the dopant into the material to a predetermined depth.

Advantageously, the drive-in time is decreased in that the diffusion process starts at a point within the wafer—avoiding the drive-in time necessary to reach that point.

Surprisingly, the dopant diffuses into the semiconductor material at a substantially increased rate while the lateral diffusion rate of the dopant decreases when the laser beam is used to form the excavation.

Furthermore, such reduction of the lateral spreading of the dopant results in a higher number of devices being fabricated per given area of the semiconductor wafer.

Additionally, the reduction of lateral spreading and the decreased dopant drive-in times permit the use of larger diameter wafers having increased thickness.

Also, the instant method eliminates photolithographic and etching steps required in the prior art which are time consuming and expensive.

BRIEF DESCRIPTION OF THE DRAWINGS

FIG. 1 is a plan view of a semiconductor wafer having a plurality of active circuit devices formed therein;

FIG. 2 is a block diagram of a prior art process for forming isolation regions on the semiconductor wafer;

FIG. 3 is a cross-sectional view of an isolation region formed in a semiconductor wafer using the prior art process;

FIG. 4 is a plan view of a semiconductor wafer having a plurality of active electrical devices and an array of blind holes formed therein;

FIG. 5 is a block diagram of the present process for driving a dopant into the semiconductor wafer;

FIG. 6 is a cross-sectional view of an isolation region formed in a semiconductor wafer in accordance with the present invention;

FIG. 7 is a series of curves representing drive-in time of dopants versus diffusion depth of both the present and prior art processes;

FIG. 8 is a cross-sectional view of a semiconductor wafer fabricated in accordance with the present invention;

FIG. 9 is an isometric view of a semiconductor wafer in which a laser forms a grid array of trenches therein;

FIG. 10 is an isometric view of a semiconductor wafer in which a laser forms a grid array of blind holes therein; and FIG. 11 is a block diagram of an alternate embodiment of the instant invention.

DETAILED DESCRIPTION OF THE PREFERRED EMBODIMENT

The preferred embodiment of the instant invention will be described relative to the forming of isolation regions in a semiconductor wafer. However, such disclosure is for purposes of exposition and not for limitation, for the instant concepts may be employed to diffuse impurities into semiconductor material at any region to desired depths where the forming of excavations such as blind holes, troughs, trenches or the like can be tolerated.

FIG. 1 is a plan view of a semiconductor wafer 10 having a multitude of areas 11—11 where the active portions of electrical devices such as transistors, integrated circuits or the like are to be formed as is well known in the art. It should be noted that the areas 11—11 are set out as small squares on the wafer 10 for purposes of explanation but are only approximate locations and not discernable as such on the processed wafer. The wafer 10 may be silicon, germanium, gallium arsenide or other semiconductor material. Prior to fabricating the active portions of the devices in the areas 11—11 on the wafer 10 it, at times, becomes necessary to form deep isolation regions 12—12 which fully extend through the wafer and become a part of the device and thereby provide electrical isolation between the active portions within each device. In the prior art such isolation regions 12—12 were formed by diffusing dopant material into the wafer 10 using the process steps set forth in FIG. 2, resulting in the isolation region shown in the partial cross-sectional view of the wafer 10 shown in FIG. 3.

In the prior art process, oxide layers 13—13 were grown on both major surfaces 14—14 of the semiconductor wafer 10 by heating the wafer in a steam atmosphere. The oxide layers 13—13 were then coated with photoresist (not shown) which, in turn, were selectively exposed to ultra-violet light. After such exposure, the selected portions of the photoresist are washed away, leaving a photoresist mask having openings through which portions of the oxide layers 13—13 are exposed. The masked wafer 10 is then subjected to an etchant which removes the exposed portions of the oxide layer 13 to form a grid pattern of openings 18—18 therein which, in turn, expose a pattern of selected portions 19—19 of surfaces 14—14 of the wafer. This process is normally accomplished on both major surfaces 14—14 of the wafer 10 as indicated in FIG. 3, so that impurities may be driven in from both sides of the wafer to meet at approximately the half-way point within the wafer. This procedure will decrease the total drive-in time by about one-half or more as compared to the prior art process.

Once the openings 18—18 have been formed, the remaining photoresist is removed and a further oxide layer containing dopant material such as Boron, Arsenic, Antimony or the like is deposited over the surfaces 14—14 of the wafer 10 and placed in a furnace for about 20 minutes at a temperature of 1200° C. to drive the dopant into the wafer to a shallow pre-dope depth of about 0.1 of a micron. The wafer 10 is then taken from the furnace and the remaining portions of the dopant oxide layers are removed. The selectively doped wafer 10 is again placed in the furnace for a period of time and at an elevated temperature sufficient to drive the dopant material into the wafer to a predetermined depth from each of the major surfaces 14—14, resulting in isolation regions 12—12 that extend through the wafer.

As hereinbefore indicated such a process results in the formation of an acceptable isolation region 12 in the wafer 10. However, the dopant drive-in time, which is respresented by the lower curve 26 in FIG. 7, is approximately 78 hours to drive the dopant to a depth of 0.003 of an inch into the wafer. Additionally, the lateral spreading of the dopant has been found to be, undesirably, equal to or greater than the drive-in depth.

The foregoing problems have been overcome with the instant process depicted in FIGS. 4, 5 and 6. FIG. 4 is a plan view of a silicon wafer 10 which has been processed using the instant concepts. FIG. 5 indicates that oxide (i.e., silicon dioxide) layers 13—13 are formed on the major surfaces 14—14 of the silicon water 10, as hereinbefore described in the prior art process. A high energy beam 27 (see FIG. 9 or 10) is directed at the wafer 10 to form a patterned array of blind hole-like excavations 28—28 in the wafer 10 which also removes portions of the oxide layers 13—13 thereabove (see FIG. 6). A further oxide layer containing the dopant (e.g., Boron, Arsenic, Antimony, etc.) is then deposited on the oxide layers 13—13 of the wafer 10, as well as in the excavations 28—28. The wafer 10 is then placed in a furnace at 1200° C. for a short pre-dope period of time (20 minutes) to drive the dopant into the wafer to a shallow depth of approximately 0.1 of a micron. The wafer 10 is then withdrawn from the furnace and the dopant residue is removed from the surface of the oxide layers 13—13 and the excavations 28—28. The wafer 10 is then placed back into the furnace or heated with a laser beam having an intensity sufficient to heat but not melt the wafer as described in an article titled "Inducing Impurity Migration in Semiconductors by Lasers," in the *IBM Technical Disclosure Bulletin*, Vol. 11, No. 2, July 1968. The heat is applied for a time and at an elevated temperature sufficient to drive the dopant material into the wafer to a predetermined deep depth from both surfaces 14—14 of the wafer.

The excavations 28—28 may be formed using a high energy beam 27 such as an electron beam, electric arc or the like. Additionally, a scribing implement or chemical etchants may be used to form the excavations 28—28. Accordingly, it is not how the excavations 28—28 are formed, but that they are formed so that diffusion of the dopant starts at a point below the semiconductor material—eliminating the time to drive the dopant to that depth.

However, applicant has discovered that by using a laser beam to form the excavations 28—28, additional benefits accrue. Use of the laser decreases the length of time required to drive in the dopant material into the wafer 10 to a desired depth (exclusive of the depth of excavations 28—28), as can be seen by comparing dopant drive-in times using a laser, shown in curve 31 in FIG. 7, with curve 26 of the same figure. Furthermore, the total depth attained by the dopant material is advantageously increased by the depth of the excavation 28 and is shown in curve 32 of FIG. 7. For example, where the prior art process is used, after a drive-in time of approximately 40 hours, the dopant material reaches a depth of about 0.002 of an inch, while in using the instant method the total depth achieved in the same time period is about 0.006 of an inch. Additionally, the lateral spreading of the dopant material was found to substantially decrease from approximately 0.001 of an inch maximum lateral spread per 0.001 of an inch of total depth of dopant in the wafer 10 in the prior art process to 0.00075 of an inch maximum lateral spread per 0.001 of an inch of the total depth of dopant in the wafer.

The excavations 28—28 formed with a laser beam were approximately 0.002 of an inch in depth with a substantially circular entrance diameter of about 0.001 of an inch. The excavations 28—28 were spaced apart approximately 0.002 of an inch, however, the excavations may be brought closer depending on the lateral spreading of the dopant material required. Further, the laser beam may be used to form continuous trench-like excavations 28'—28' as shown in FIG. 9.

The increased diffusion depths of dopant material as well as the reduction of the lateral spreading thereof is, as hereinbefore indicated, in part due to the excavation 28 which permits the diffusion of the dopant to start at a depth well below the major surfaces 14—14 of the semiconductor wafer 10. However, as hereinbefore indicated, the diffusion of the dopant material in the wafer 10 from the point at which the excavation terminates increases at an unexpected high rate with an attendant decrease in the lateral diffusion. Although the mechanism is not fully understood one possibility is that dislocations or diffusion "pipes" are formed in the semiconductor wafer 10 due to the extremely directional and localized heat provided by the laser in a short period of time. Such "pipes" provide paths for the diffused dopant material to follow at rates not heretofore obtainable using the prior art process.

In an alternative embodiment of the instant invention, the semiconductor wafer 10 can be coated with an oxide layer containing the dopant material and a high energy laser beam 27 directed at selected portions of the wafer (see FIG. 11) to simultaneously form the excavation 28 and drive the dopant into the wafer to the desired shallow pre-dope depth. The remaining dopant oxide coating on the wafer 10 can then be removed and the wafer placed in the furnace or laser heat used to drive the dopant to the predetermined deep depth.

In a particular exemplary embodiment of the instant invention, shown in the partial cross-sectional view of FIG. 8, a boron oxide dopant material was deposited in excavations 28—28 and diffused into the silicon semiconductor wafer 10 to form isolation regions 12—12 which surround the active areas 11—11 in a plurality of electrical devices 41—41. The electrical devices 41—41 may be any type of semiconductor devices having various combinations of N or P doped regions in a semiconductor material to form transistors, diodes or the like in the active areas 11—11. Typically, the isolation regions 12—12 are diffused into the wafer 10 prior to fabrication of the active portions 11—11 of the devices 41—41 for the devices cannot stand relatively long, high temperature drive-in times required to form the isolation regions.

The wafer 10 used in the exemplary embodiment was 1.5 inches in diameter and had a thickness of 0.006 inch. The laser used to form the excavations was a Nd:YAG operating in the $TEM_{oo}$ mode, having a peak power of 15 Kw; 500 Hz repetition rate; a pulse length of 70 nanoseconds; and a focussed spot size diamicron of approximately $25\mu$ microns.

Although the exemplary embodiment is directed to the diffusion of dopants from both major surfaces 14—14 of the wafer 10, in order to decrease the diffusion time it should be apparent that diffusion from one of the major surfaces may be accomplished using the instant concepts where longer drive-in times and additional lateral diffusion can be tolerated.

What is claimed is:

1. A process for diffusing a dopant into a semiconductor material, comprising the steps of:
   forming at least one excavation in the semiconductor material with a laser beam; and
   diffusing the dopant through at least the one excavation into the semiconductor material.

2. The process as set forth in claim 1, which is further characterized by:
   depositing the dopant on the surface of the semiconductor prior to forming of each excavation to drive the dopant into the material to a first predetermined depth as the excavation is formed.

3. The process as set forth in claim 1, which is further characterized by:
   depositing the dopant into at least one excavation; and
   heating the semiconductor material and dopant to an elevated temperature for a time sufficient to diffuse the dopant into the semiconductor material to a predetermined depth.

4. The process as set forth in claim 2, which is further characterized by:
   heating the semiconductor material and dopant to an elevated temperature for a time sufficient to diffuse the dopant into the semiconductor material to a second predetermined depth.

5. The process as set forth in claim 4, wherein the elevated temperature is provided by a laser beam.

6. The process as set forth in claim 3, wherein the elevated temperature is provided by a laser beam.

7. A process for diffusing a dopant into a semiconductor wafer to form an isolation region therein, comprising the steps of:
   (a) growing an oxide coating on at least one major surface of the wafer;
   (b) directing a laser beam at the oxide coated wafer to form an excavation in the wafer and simultaneously remove portions of the oxide coating thereabove;
   (c) depositing the dopant on the oxide coated wafer to coat the oxide and fill the excavation; and
   (d) heating the wafer for a first time period at a temperature sufficient to diffuse the dopant in the excavation into the wafer to a first predetermined depth.

8. The process as set forth in claim 7, comprising the additional steps of:
   (e) removing the residue of the oxide coating from the wafer surface; and
   (f) heating the wafer for a second time period at an elevated temperature sufficient to further diffuse the dopant in the wafer to a second predetermined depth to form the isolation region.

9. A process of forming a multitude of electrical semiconductor devices on a planar silicon substrate, each device having an active circuit portion surrounded by an isolation region, the process comprising the steps of:
   growing a silicon dioxide layer on at least one major surface of the substrate;
   forming a patterned grid array of excavations with a laser beam on at least one of the major surfaces of the substrate, the excavations extending through the silicon dioxide layer and into the substrate to a first predetermined depth;

coating the substrate with a Boron doped oxide which covers the remaining silicon dioxide and fills the excavations;

heating the coated substrate in a furnace to heat the substrate and the doped oxide to an elevated temperature for a time sufficient to diffuse the doped oxide in the excavations into the silicon substrate to a second predetermined depth;

removing the wafer from the furnace to remove the doped oxide residue from the surface of the silicon dioxide layer and the excavations;

further heating the silicon substrate in the furnace to heat the doped substrate to an elevated temperature for a time sufficient to further diffuse the doped oxide in the substrate to a third predetermined depth to form isolation regions; and fabricating the active portions of each device within the isolation regions to form the multitude of electrical semiconductor devices.

10. A process for diffusing a dopant into a semiconductor wafer to form an isolation region therein, comprising the steps of:
(a) depositing a dopant on at least one major surface of the wafer; and
(b) directing a laser beam at selected portions of the wafer to simultaneously form an excavation therein and diffuse portions of the dopant into the wafer to a first predetermined depth.

11. The process as set forth in claim 10, comprising the additional steps of:
(c) removing the residue of the dopant from the surface of the wafer; and
(d) heating the wafer for a period of time at a temperature sufficient to further diffuse the dopant in the wafer to a second predetermined depth to form the isolation region.

12. A process of forming a multitude of electrical semiconductor devices on a planar silicon substrate, each device having an active circuit portion surrounded by an isolation region, the process comprising the steps of:

coating at least one of the major surfaces of the substrate with a Boron doped oxide;

directing a high energy laser beam at selected areas of the substrate to form a patterned grid array of excavations while simultaneously diffusing portions of the boron doped oxide into the wafer to a first predetermined depth;

removing the residue of the boron doped oxide from the surface of the wafer;

placing the wafer in a furnace to heat the wafer to an elevated temperature for a time sufficient to diffuse the boron doped oxide therein to a second predetermined depth; and fabricating the active portions of each device within the isolation regions to form the multitude of electrical semiconductor devices.

* * * * *